United States Patent [19]

Valade

[11] 3,972,549

[45] Aug. 3, 1976

[54] AUXILIARY LATCH SYSTEM FOR A VEHICLE COMPARTMENT PANEL

[75] Inventor: Victor D. Valade, Sterling Heights, Mich.

[73] Assignee: General Motors Corporation, Detroit, Mich.

[22] Filed: Sept. 25, 1974

[21] Appl. No.: 509,277

[52] U.S. Cl. .................................. 292/182; 180/112; 292/DIG. 14

[51] Int. Cl.$^2$ ...................... E05C 1/06; B60K 27/00

[58] Field of Search .............. 180/112; 292/DIG. 14, 292/DIG. 65, 177, 182

[56] References Cited

UNITED STATES PATENTS

| | | | |
|---|---|---|---|
| 1,256,848 | 2/1918 | Uttz | 180/112 X |
| 1,477,771 | 12/1923 | Rowntree | 180/112 X |
| 1,856,391 | 5/1932 | Keppler | 180/112 X |
| 3,026,132 | 3/1962 | Korab et al. | 292/DIG. 14 |

FOREIGN PATENTS OR APPLICATIONS

| | | | |
|---|---|---|---|
| 1,212,176 | 11/1970 | United Kingdom | 292/DIG. 65 |

*Primary Examiner*—Paul R. Gilliam
*Attorney, Agent, or Firm*—J. A. Kushman

[57] ABSTRACT

An auxiliary latch system for a vehicle compartment panel that assists the primary latch mechanism thereof in holding the panel in closed position in response to energy absorbing movement of a bumper of the vehicle. The auxiliary latch system includes one or more secondary latch mechanisms, each of which includes a latch member spring biased to an unlatched position. A first lever of each secondary latch mechanism is rotatable to engage and move the associated latch member to a latched position in latching engagement with the closed compartment panel to provide the assist to the primary latch mechanism in holding the panel closed. A separate elongated cable associated with each secondary latch mechanism extends between the associated first lever and a common second lever pivotally mounted on the vehicle adjacent the energy absorbing bumper. Energy absorbing movement of the bumper from an extended position toward a retracted position rotates the second lever and pulls the cables so as to rotate the first levers of the secondary latch mechanisms and thereby initiates the auxiliary latching of the compartment panel by the secondary latch mechanisms.

2 Claims, 5 Drawing Figures

AUXILIARY LATCH SYSTEM FOR A VEHICLE COMPARTMENT PANEL

BACKGROUND OF THE INVENTION

Vehicles of the automotive or truck type conventionally include an engine compartment in which the vehicle engine is mounted, and a compartment panel is mounted on the vehicle for movement between open and closed positions with respect to an opening of the compartment to selectively allow access to the compartment and the engine. Most automotive type vehicles also include a luggage compartment likewise opened and closed by a compartment panel mounted on the vehicle. Generally, a primary latch mechanism is used to secure the compartment panel in closed position upon movement thereto and is selectively actuated to unlatch the compartment panel for opening movement. An auxiliary latch mechanism may also be incorporated to provide a secondary latching of the compartment panel in closed position upon movement thereto. The auxiliary latch mechanism is likewise actuated to release the compartment panel for opening movement either concomitantly with the actuation of the primary latch mechanism or through a second manual releasing actuation. Many different types of primary and secondary latch mechanisms of the type which latch upon closing compartment panel movement have been disclosed by the prior art.

Current production vehicles also incorporate energy absorbing bumpers mounted for movement from an extended position toward a retracted position in an energy absorbing mode to dissipate energy when the bumper engages an obstacle. For the most part, the bumpers are supported for this energy absorbing movement by piston and cylinder arrangements in a telescoping fashion with the retraction of these arrangements causing the energy absorption as the bumper moves inwardly toward the center of the vehicle to the retracted position from the extended position.

SUMMARY OF THE INVENTION

The present invention provides an auxiliary latch system for a vehicle compartment panel in which an auxiliary latching of the compartment panel in closed position is actuated by energy absorbing movement of an energy absorbing bumper on the vehicle as it engages an obstacle.

One feature of this auxiliary latch system is that a latch member thereof is engaged by a first pivoted lever thereof upon lever rotation caused by the pulling action of a flexible cable attached to this lever, and the cable is also attached to a second lever pivoted to the vehicle so that the bumper engages this second lever to rotate it and pull the cable during energy absorbing bumper movement. Another feature of the auxiliary latch system is that the first lever is pivoted intermediate opposite ends thereof to the vehicle, with one end of the first lever engaging the latch member to move the latter to latched position, and with the cable having one end thereof attached to the other end of the first lever and the other end thereof attached to the second lever so the cable functions in a pulling manner to rotate the first lever and latch the panel upon the rotation of the second lever caused by the bumper movement. Another feature of the auxiliary latch system is that the latch member, the first lever, and a spring which biases the latch member to its unlatched position are all housed by a housing of a secondary latch mechanism of the system, and more than one of these secondary latch mechanisms may be connected to the second lever by respective cables so that each provides an auxiliary latching of the compartment panel in closed position upon operation of the energy absorbing bumper.

BRIEF DESCRIPTION OF THE DRAWINGS

The above specified features and other features, objects and advantages of the present invention are readily apparent from the following detailed description of the preferred embodiment and the drawings in which.

DETAILED DESCRIPTION OF THE PREFERRED EMBODIMENT

Figure 1:
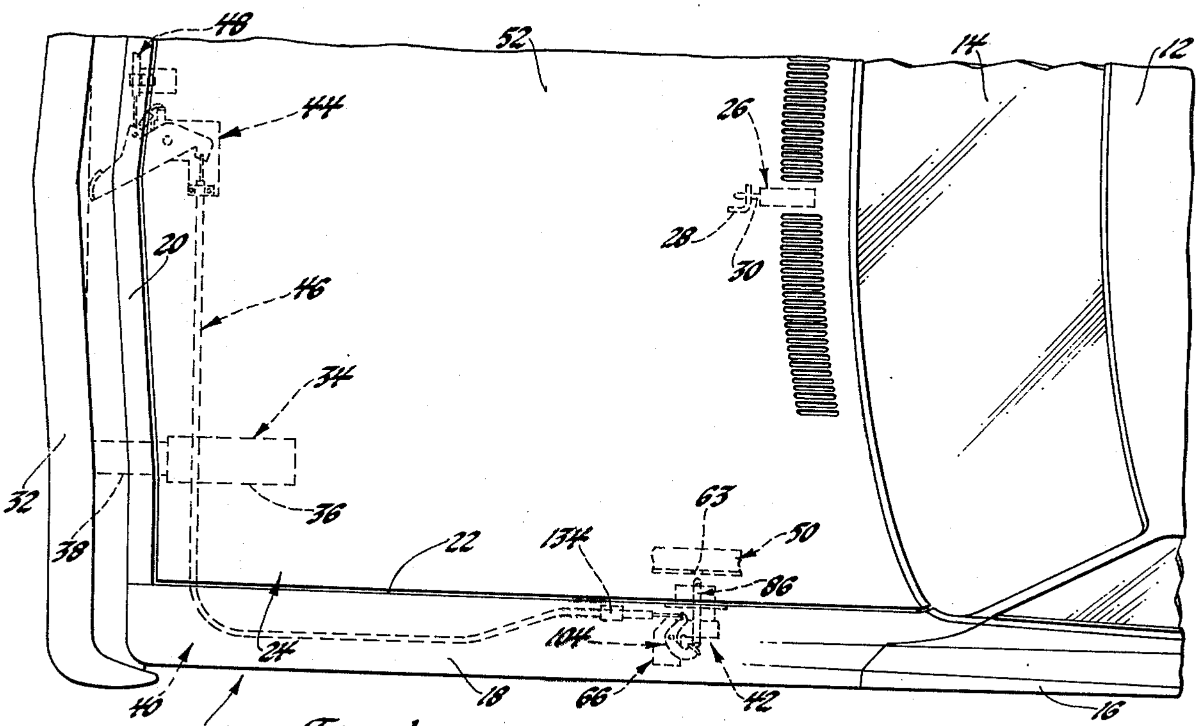
FIG. 1 is a top plan view of a portion of a vehicle having a compartment panel whose primary latch mechanism is assisted in holding the panel in closed position by an auxiliary latch system according to this invention upon operation of an energy absorbing bumper of the vehicle.

Referring generally to FIG. 1, a vehicle generally indicated by 10 includes a roof 12, a windshield 14, a side door 16, and a front fender 18. At its forward end, fender 18 is connected to a cross panel 20 that extends laterally across the front of the vehicle to join an unshown front fender on the other side of the vehicle. The cross panel 20 and side fenders of vehicle 10 cooperate with the lower edge of windshield 14 to provide a compartment opening generally indicated by 22. A compartment panel 24 is mounted on vehicle 10 by suitable unshown hinges adjacent its forward end. The rear end of panel 24 thus swings upwardly as it is moved about these hinges to an open position so as to provide access to the compartment.

The vehicle 10 supports a primary latch mechanism 26 just forward of the forward edge of windshield 14 at a central portion thereof, and a keeper 28 on the lower side of panel 24 is engaged by a bolt 30 of this latch mechanism upon closing movement of the panel to thereby hold the panel closed. A suitable cable or the like is attached to latch mechanism 26 to provide unlatching thereof. A latch mechanism like latch mechanism 26 is disclosed by the U.S. Pat. of Gionet et al U.S. Pat. No. 3,695,659, which is assigned to the assignee of the present invention and is hereby incorporated by reference. Latch mechanism 26 may also be constructed like other conventional primary latch mechanisms for vehicle compartment panels and is thus not being disclosed in detail.

A bumper 32 extends laterally across the forward edge of vehicle 10 just in front of cross panel 20 and is supported by a separate energy absorbing arrangement 34 at each of its lateral sides, only one of these energy absorbing arrangements being shown. This energy absorbing arrangement 34 may be of the type shown by the following patents which are assigned to the assignee of the present invention U.S. Pat. Nos.: 3,700,273 Jackson et al, 3,736,645 Finnin et al, 3,754,784 Heinig et al, and 3,814,219 Finnin et al. These patents are hereby incorporated by reference to illustrate embodiments that energy absorbing arrangement 34 may take. This arrangement utilizes a cylinder 36 mounted on the vehicle 10 in a fixed manner and slidably receiving a plunger 38 in a telescopic fashion, with the adjacent end of the bumper 32 supported by the plunger. Telescopic movement of plunger 38 within cylinder 36 as bumper 32 moves from a forward extended position to a rearward retracted position upon impact with an obstacle causes the energy absorbing arrangement to absorb energy. Thus, whenever bumper 32 is impacted by an obstacle, the operation of energy absorbing arrangement 34 cushions the severity of the change in rate of vehicle movement.

An auxiliary latch system according to the present invention is generally indicated by numeral 40 to FIG. 1 and incorporates a secondary latch mechanism 42 located generally adjacent the rear end of fender 18, an actuating lever arrangement 44 mounted on the vehicle just rearward of the central portion of bumper 32, and a cable 46 which extends from the actuating lever arrangement 44 to the secondary latch mechanism 42 so as to actuate this latch mechanism upon energy absorbing movement of bumper 32. Secondary latch mechanism 42 thus assists the primary latch mechanism 26 in holding the compartment panel 24 in closed position when bumper 32 impacts with an obstacle. Also, a second cable 48 of latch system 40 is connected to lever arrangement 44 and extends therefrom in an opposite direction from cable 46 to an unshown secondary latch mechanism on the opposite side of panel 24 from the latch mechanism 42. This unshown secondary latch mechanism is identical to the secondary latch mechanism 42 except for being of opposite hand and is actuated by cable 48 in the same manner that cable 46 actuates latch mechanism 42. As such, it is believed that the showing of this latch mechanism 42 is sufficient for purposes of understanding the operation of the latch system. It is also apparent that more than two secondary latch mechanisms may be used with the latch system of this invention.

Figure 4:
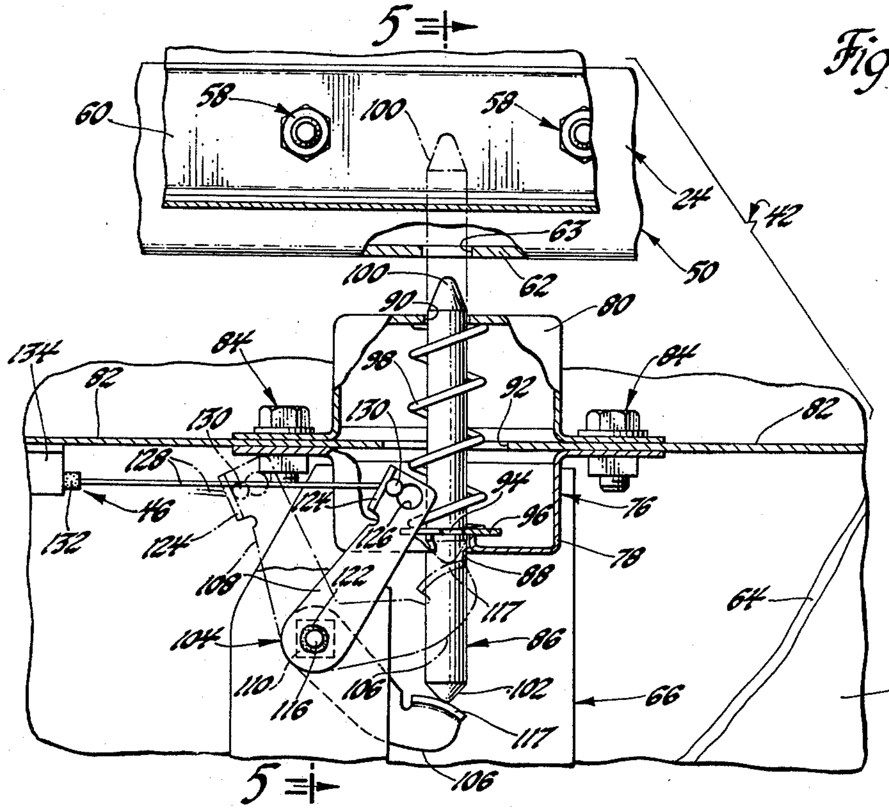
FIG. 4 is an enlarged view of a portion of FIG. 1 with part of the vehicle fender and compartment panel broken away to show one of the secondary latch mechanisms.
Figure 5:
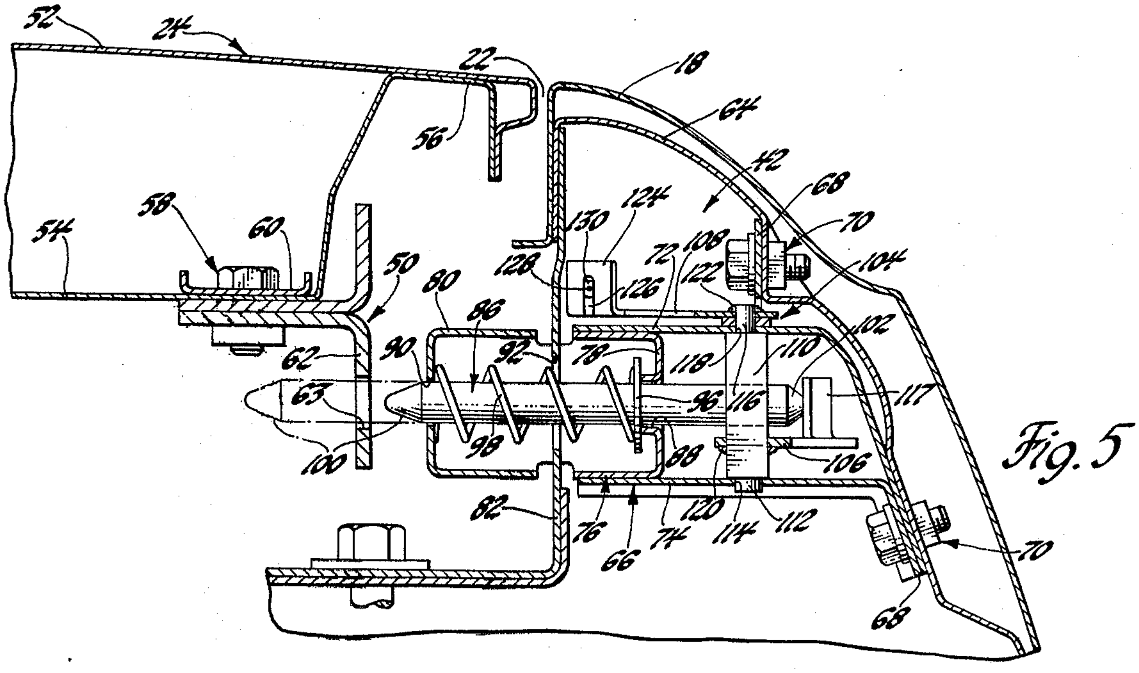
FIG. 5 is a sectional view of the secondary latch mechanism shown in FIG. 4 and taken generally along line 5—5 of FIG. 4.

FIGS. 4 and 5 illustrate enlarged views of the secondary latch mechanism 42 which is cooperable with a keeper plate generally indicated by 50 and mounted on the compartment panel 24. As best seen in FIG. 5, this compartment panel 24 includes an outer panel 52 and an inner panel 54. These panels are suitably welded to each other at edge portions 56 in a conventional manner. Just below and inwardly from the edge portions, the keeper plate 50 is mounted on the inner panel 54 by a number of nut and bolt arrangements 58. Brackets 60 on each side of the inner panel 54 strengthen this panel to provide a secure support for keeper plate 50. This keeper plate has an angle-iron configuration with a downwardly depending flange 62 that defines an aperture 63. This aperture faces in a lateral direction with respect to vehicle 10.

The secondary latch mechanism 42 is mounted on an inner panel 64 of fender 18 as seen in FIG. 5. Latch mechanism 42 includes a housing generally indicated by 66 and having flanges 68 secured to fender inner panel 64 by nut and bolt arrangements 70. Upper and lower walls 72 and 74 of housing 66 have their left-hand ends, as viewed in FIG. 5, positioned on opposite sides of a rectangular box shaped secondary housing 76 of this latch mechanism. The secondary housing 76 is formed from two half sections 78 and 80 respectively positioned on outer and inner sides of a vertical panel 82 of the fender 18. As seen in FIG. 4, nut and bolt arrangements 84 secure the half sections 78 and 80 to the vertical fender panel 82 and thus assist in providing a secure mounting of the housing 66 to the vehicle.

Still referring to FIGS. 4 and 5, an elongated pin type latch member 86 is slidably mounted within end apertures 88 and 90 of the secondary housing half sections 78 and 80 and also extends through a somewhat larger aperture 92 in the vertical fender panel 82. Latch member 86 defines an annular groove 94, seen in FIG. 4, and this groove receives a split washer 96 that is snapped into position. A helical spring 98 received within secondary housing 76 encircles the latch member 86 and has one of its ends seated against washer 96. The other end of spring 98 is seated against the half section 80 of secondary housing 76 and the spring thus biases latch member 86 to a retracted unlatched position, located downwardly when viewed as in FIG. 4 or to the right as viewed in FIG. 5. Actuation of latch mechanism 42, in a manner that will be described later, causes the spring 98 to be deflected as latch member 86 moves to the phantom line extended latched position of FIGS. 4 and 5 where the inner end 100 of the latch member is received within the aperture 63 in keeper plate 50. The latch member 86 is then in latching engagement with the compartment panel 24 and assists the primary latch mechanism 26 shown in FIG. 1 in maintaining the compartment panel in closed position.

The outer end of latch member 86 is indicated by 102 and is acted upon by a first lever of the secondary latch mechanism which is generally indicated by 104. As can be seen by combined reference to FIGS. 4 and 5, the first lever 104 includes a pair of lever arms 106 and 108, as well as an interconnecting pintle portion 110. The pintle portion 110 of lever 104 extends in a vertical direction with a square cross section between the upper and lower walls 72 and 74 of latch housing 66. As seen in FIG. 5, the pintle portion 110 has a lower pintle end 112 that is received within a round aperture 114 in the lower housing wall 74. The upper end of pintle portion 110 has an upper pintle end 116 extending upwardly through a round aperture 118 in the upper housing wall 72. The first lever arm 106 is located between housing walls 72 and 74 and is fixedly secured to the pintle portion 110 by weld 120, FIG. 5. The pintle portion 110 rotatably supports this lever arm 106 for movement from its solid line indicated position of FIG. 4 to its phantom line indicated position so that a flange 117 on its outer end engages the outer end 102 of latch member 86 and moves the latch member inwardly against the bias of spring 98 to its phantom line indicated latched position.

The lever arm 108 of first lever 104 is secured to the upper pintle end 116 above housing wall 72 by a weld 122 seen in both FIGS. 4 and 5. An included angle of slightly more than 90° is defined between the two lever arms 106 and 108 as can be seen in FIG. 4. The outer end of lever arm 108 includes a bent flange 124 and has a keyhole shaped aperture 126 whose elongated slot portion extends from the main portion of the lever onto the bent flange 124 as best seen in FIG. 5. An elongated flexible element 128 of cable 46 has a ball 130 secured to its end shown in FIG. 4, and this ball is inserted through the large portion of aperture 126. The ball 130 then engages the lever flange 124 on the opposite side thereof from cable 46 to secure the elongated element 128 to the lever arm 108. This elongated element 128 is slidably received by an outer sheathing 132 of cable 46 as can be seen in the left-hand portion of FIG. 4 and this sheathing is fixedly secured by a bracket 134 to the vertical fender panel 82.

Figure 2:
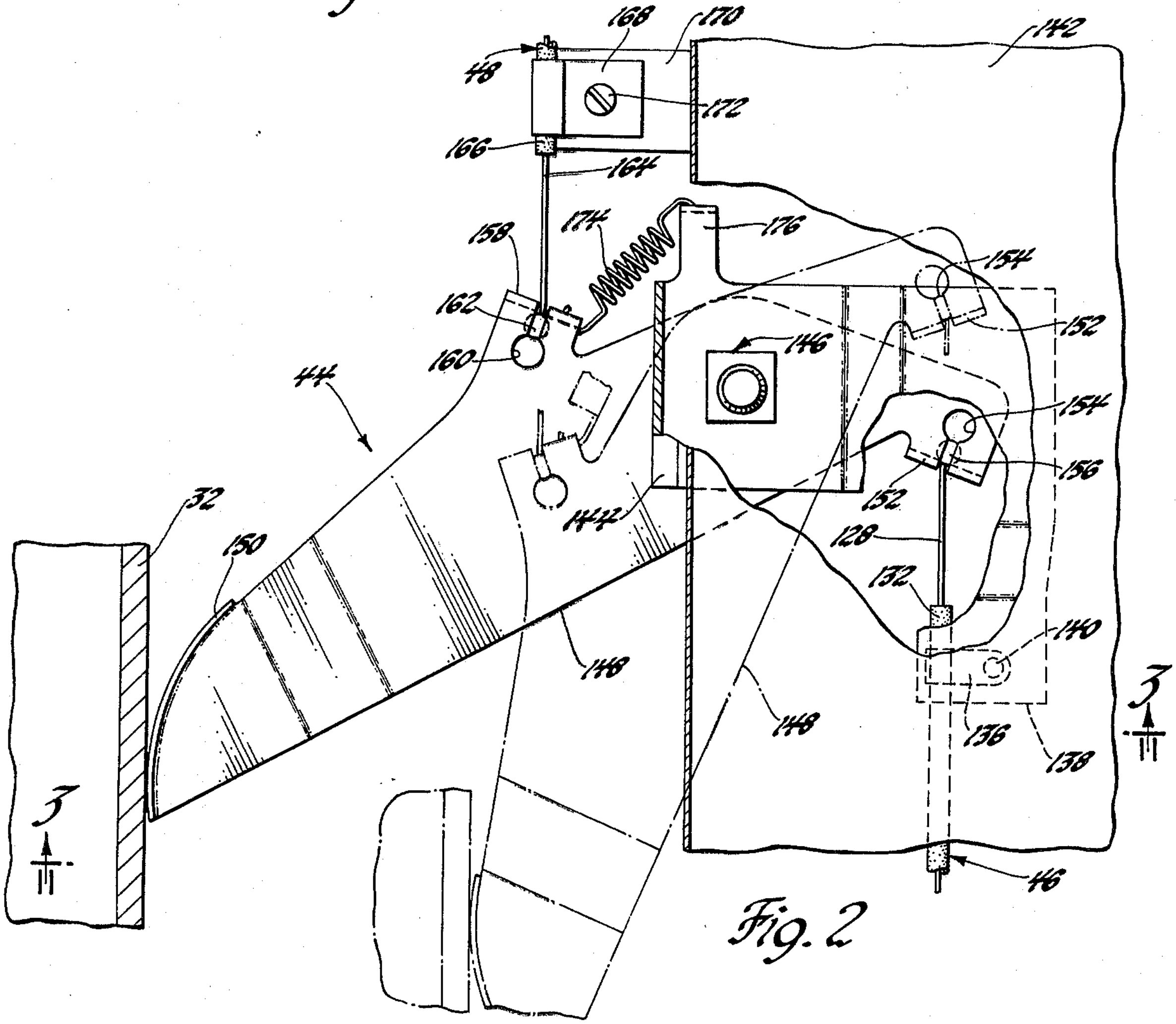
FIG. 2 is an enlarged view of a portion of FIG. 1 showing a lever arrangement whose lever is rotated by energy absorbing bumper movement to provide cable actuation of secondary latch mechanisms of the auxiliary latch system so as to thereby initiate the auxiliary latching of the compartment panel.
Figure 3:
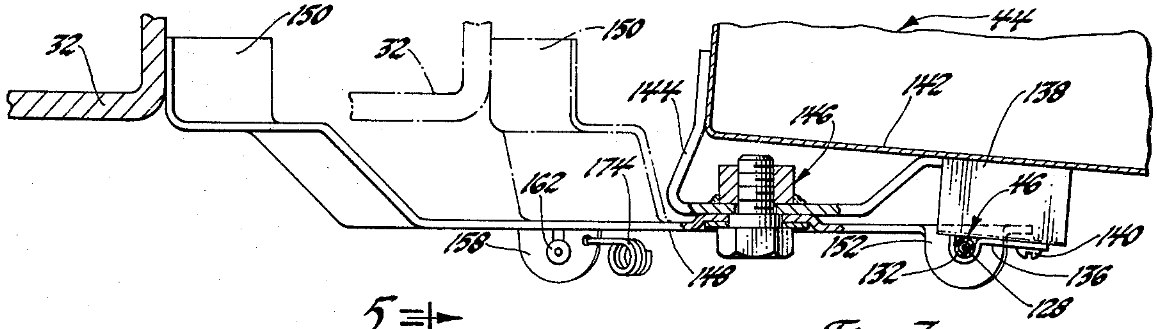
FIG. 3 is a side view of the bumper and lever arrangement taken generally along line 3—3 of FIG. 2.

With reference to FIG. 1, cable 46 extends from the secondary latch mechanism 42 in a forward direction and then laterally inward with respect to the vehicle to the lever arrangement 44. At lever arrangement 44, as seen in FIGS. 2 and 3, the adjacent end of cable sheathing 132 is fixedly secured by a flange 136 of a bracket 138. This flange 136 is tightened by a screw 140 to secure the cable sheathing attachment. Bracket 138 is suitably mounted on a front end panel 142 of vehicle 10 and includes a lever support portion 144 that has a somewhat unsymmetrical U-shaped configuration when viewed as in FIG. 3. This bracket support portion 144 mounts a suitable nut and bolt arrangement 146 which pivotally supports a second lever 148.

The lever 148 of lever arrangement 44 has an arcuately flanged end 150 which engages the bumper 32 and another flanged end 152 on the opposite side of nut and bolt arrangement 146 from flanged end 150. The flanged lever end 152 has a keyhole shaped aperture 154 whose elongated portion extends from the main lever end portion to the flanged portion. This aperture receives a ball 156 attached to the adjacent end of elongated cable element 128 as seen in FIG. 2. Another flange 158 of lever 148 is located between the nut and bolt arrangement 146 and the arcuately flanged end 150 of this lever and defines a keyhole shaped aperture 160 similar to aperture 154. This aperture 160 receives and attaches a ball 162 on the end of an elongated flexible element 164 of cable 48. The elongated element 164 is slidably received by an outer cable sheathing 166 of cable 48 as shown in FIG. 2. The adjacent end of this cable sheathing 166 is secured by a flange 168 of a bracket 170 supported on the vehicle front end panel 142 in a suitable manner, and a screw 172 secures the attachment. A helical spring 174, see FIG. 2, extends between the flange 158 of lever 148 and a flange 176 of bracket 138. This spring 174 biases the lever 148 so that its flanged end 150 is constantly engaged with the energy absorbing bumper 32.

During the energy absorbing inward movement of bumper 32, the lever 148 of actuating lever arrangement 44 is pivoted counterclockwise as viewed in FIGS. 1 and 2 and thereby pulls the flexible elements 128 and 164 of their respective cables 46 and 48. This pulling action causes cable 46 to rotate the lever 104 of secondary latch mechanism 42 in a counterclockwise direction, as viewed in FIGS. 1 and 4, and thereby moves the latch member 86 of this latch mechanism to its latched position in latching engagement with the compartment panel 24. The cable 48 likewise latches the unshown secondary latch mechanism on the other side of the compartment panel 24 in the same manner. The secondary latch mechanisms thus provide an assist to the primary latch mechanism 26 in maintaining the compartment panel 26 in its closed position.

The arcuately flanged configuration of the lever end 150 maintains this lever end in a normal relationship with respect to the bumper 32 as this lever end slidably engages the inwardly moving bumper. This normal relationship causes the lever 148 to be rotated in a smooth manner to latch the secondary latch mechanisms. The pulling action of the cables 46 and 48 during this action ensures the latching without any kinking problems. Also, when the bumper 32 returns to its extended position for reuse, the spring 174 of lever 148 pivots the lever clockwise as viewed in FIGS. 1 and 2 so that the spring 98 of secondary latch mechanism 42 and the corresponding spring of the unshown secondary latch mechanism will be able to unlatch these mechanisms from the compartment panel 24.

The foregoing description is believed to adequately describe the improved auxiliary compartment panel latch system of this invention.

What is claimed is:

1. In a vehicle including an energy absorbing bumper movable from an extended position to a retracted position with respect to the vehicle to absorb energy upon impact with an obstacle, a pair of laterally spaced front fender structures having their forward ends connected by a laterally extending cross panel and cooperating to define a compartment opening of the vehicle, a compartment panel movable between open and closed positions with respect to the compartment opening of the vehicle, and a primary latch mechanism for latching the compartment panel in closed position and being selectively unlatched to allow opening movement of the panel, the improvement comprising:

first and second secondary latch mechanisms respectively acting between one of the fender structures and the compartment panel at the rearward end of the fender structures opposite the laterally extending cross panel, each of said secondary latch mechanisms having a latch member movably mounted on the vehicle fender structure adjacent the compartment opening and being movable between a latched position in which the latch member engages the compartment panel to latch the panel in closed position and assist the primary latch mechanism in maintaining the panel in closed position and an unlatched position disengaged from the compartment panel to permit opening movement of the compartment panel upon unlatching of the primary latch mechanism;

each of said secondary latch mechanisms having an associated latch lever pivoted to the vehicle fender structure adjacent the latch member and being movable in first and second directions of rotation, said latch levers each having a portion which engages the associated latch member to move the latch member to the latched position upon pivoting of the latch lever in one direction of rotation;

an actuating lever having an intermediate portion between opposite ends thereof pivotally mounted on the vehicle adjacent the cross panel and the energy absorbing bumper and having one end thereof engaging the energy absorbing bumper so that the actuating lever is pivoted in one direction relative the vehicle upon energy absorbing bumper movement in response to impact of an obstacle;

first and second flexible cable assemblies connecting the latch levers of the respective first and second secondary latch mechanisms with the actuating lever, each of said cable assemblies including an elongated flexible sheath having one end attached to the vehicle adjacent the pivotal mount of the actuating lever and the other end attached to the fender structure adjacent the latch lever, the first and second flexible cable assemblies each also having an elongated flexible cable slidably received within the sheath and having one end attached to the respective latch lever, the other ends of said cables being attached to the opposite ends of the actuating lever so that pivoting movement of the actuating lever in the one direction by movement of the energy absorbing bumper causes pivoting of the latch levers in one direction to move the associated latch members to the latching position to effect latching of the secondary latch mechanisms to assist the primary latch mechanism in holding the closure panel in closed position when an obstacle is impacted;

and said first and second flexible cable assemblies flexing when impact with an obstacle causes collapse of the bumper and cross panel so that the latch members of the secondary latch mechanism are maintained in the latched positions.

2. In a vehicle including an energy absorbing bumper movable from an extended position to a retracted position with respect to the vehicle to absorb energy upon impact with an obstacle, a pair of laterally spaced front fender structures having their forward ends connected by a laterally extending cross panel and cooperating to define a compartment opening of the vehicle, a compartment panel movable between open and closed positions with respect to the compartment opening of the vehicle and a primary latch mechanism for latching the compartment panel in closed position and being selectively unlatched to allow opening movement of the panel, the improvement comprising:

a latch member movably mounted on the vehicle fender structure adjacent the compartment opening and being movable between a latched position in which the latch member engages the compartment panel to latch the panel in closed position and assist the primary latch mechanism in maintaining the panel in closed position and an unlatched position disengaged from the compartment panel to permit opening movement of the compartment panel upon unlatching of the primary latch mechanism;

a latch lever pivoted to the vehicle fender structure adjacent the latch member and being movable in first and second directions of rotation, said latch lever having a portion which engages the latch member to move the latch member to the latched position upon pivoting of the latch lever in one direction of rotation;

a bracket attached to the vehicle adjacent the energy absorbing bumper;

an actuating lever having an intermediate portion between opposite ends thereof pivotally mounted on the bracket and having one end thereof engaging the energy absorbing bumper so that the actuating lever is pivoted in one direction upon energy absorbing bumper movement in response to impact of an obstacle;

a flexible cable assembly connecting the latch lever with the actuating lever, said flexible cable assembly including an elongated flexible sheath having one end attached to the bracket and the other end attached to the vehicle fender adjacent the latch lever, the flexible cable assembly also having an elongated flexible cable slidably received within the sheath and having one end attached to the actuating lever and the other end attached to the latch lever so that pivoting movement of the actuating lever in the one direction by movement of the energy absorbing bumper causes pivoting of the latch lever in the one direction to move the latch member to the latching position to effect latching of the closure panel in closed position when the bumper functions in its energy absorbing mode;

and said bracket maintaining the relationship between the pivot of the actuating lever and the sheath of the flexible cable assembly irrespective of movement of the bracket relative the latch lever upon impact induced collapse of the vehicle so that the latch member is maintained in the latched position to assist the primary latch in maintaining the closure panel in the closed position.

* * * * *